J. C. ALQUIST.
TOOL HOLDER.
APPLICATION FILED FEB. 19, 1919.

1,422,247.

Patented July 11, 1922.

Inventor
John C. Alquist.
by Arthur Jenkins,
Attorney

UNITED STATES PATENT OFFICE.

JOHN C. ALQUIST, OF PORTLAND, CONNECTICUT.

TOOL HOLDER.

1,422,247.  Specification of Letters Patent.  Patented July 11, 1922.

Application filed February 19, 1919. Serial No. 278,014.

*To all whom it may concern:*

Be it known that I, JOHN C. ALQUIST, a citizen of the United States, and a resident of Portland, in the county of Middlesex and State of Connecticut, have invented a new and Improved Tool Holder, of which the following is a specification.

My invention relates more especially to that class of tool holders that are adapted to secure a tap, drill or like tool as in the spindle of a drill press or lathe, or in a member attached to said spindle, and an object of my invention, among others, is to provide a device of this class that shall be extremely simple in its construction and efficient in its operation.

One form of device embodying my invention and in the construction and use of which the objects herein set out, as well as others, may be attained, is illustrated in the accompanying drawings, in which—

Figure 1:
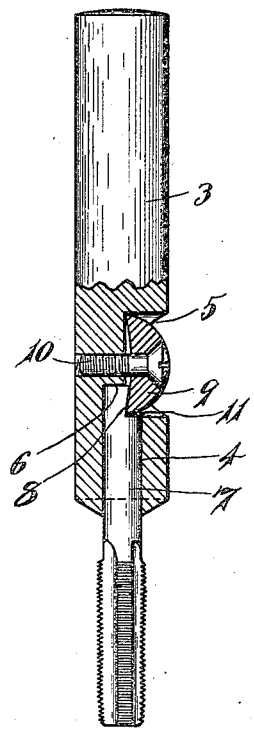
Figure 1 is a view in side elevation of a tool holder embodying my invention with a part cut away in central longitudinal section to illustrate the construction.
Figure 2:
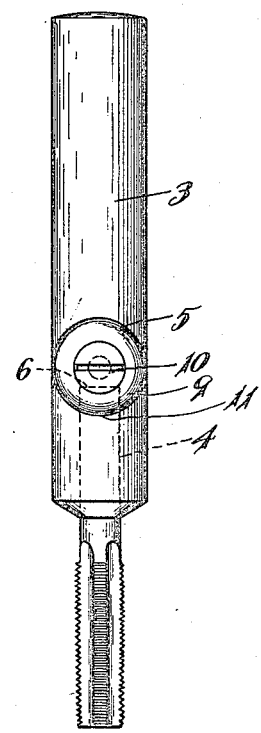
Figure 2 is a view in side elevation of my improved tool holder when viewed from a point at right angles to the point of view of Figure 1.
Figure 3:
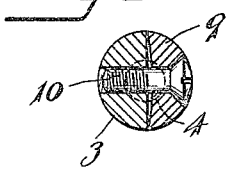
Figure 3 is a detail view in cross section through the tool shank and clamp.

In the accompanying drawings the numeral 3 indicates a holder, that in the form of device herein shown, is constructed to be secured in the spindle of a drill press or lathe in a manner well understood by those skilled in the art. A hole 4 extends from the end of the holder to a certain distance from such end, and a recess 5 is formed in the side of the holder to partially intersect said hole, but not to extend to the opposite side of the hole from that at which the recess approaches it. That is, the hole extends partially across the recess and the recess extends partially across the hole thus forming an abutting shoulder 6 against which the end of the shank 7 of the tool abuts. The end of the shank is cut away on one side as at 8, and this cut-away portion is inclined at an angle to the axis of the shank to receive the inclined under surface of a clamp 9 located within the recess 5 and secured to the holder 3 as by means of a screw 10. This clamp is of a thickness not greater than the depth of the recess 5 and it is of such dimension across it that its edge will not touch the shoulder 11 on the tool shank when the end of such shank is against the shoulder 6 on the holder 3.

The invention has been shown herein in connection with a holder, but I contemplate that the structure may be formed directly at the end of a drill spindle, if desired. The construction is such that no projections appear upon the holder or spindle, the recess 5 and the shape of the clamp 9 being such that the latter does not project beyond the outer surface of the holder. All thrust endwise upon the tool is resisted by the shoulder 6 and no strain is brought upon the screw 10. The inclined meeting surfaces on the clamp and the cut-away portion of the shank are such as to retain the tool in place against lengthwise pull and the tool as a whole presents a very compact and efficient tool holder.

In accordance with the provisions of the patent statutes, I have described the principles of operation of my invention, together with the apparatus which I now consider to represent the best embodiment thereof; but I desire to have it understood that the device shown is only illustrative and that the invention may be carried out by other means.

I claim—

1. A holder having a hole extending inwardly from its end and a recess extending inwardly from one side and intersecting said hole thereby forming a shoulder at said intersection, and a round clamp rotatably mounted in said recess and having a conical shaped concavity forming an inclined clamping face on the back thereof to engage an inclined surface of a tool and draw it against said shoulder.

2. A holder, round in cross section, and having a hole extending inwardly from its end and a recess extending inwardly from one side and intersecting said hole and thereby forming a shoulder at said intersection, and a clamp substantially in the form of a portion of a sphere and with its radii substantially the same as that of said holder in cross section, whereby said clamp lies wholly within said recess, said clamp having a conical shaped concavity on its back forming an inclined clamping face to engage an inclined surface on the tool and draw it against said shoulder.

JOHN C. ALQUIST.